(12) United States Patent
King et al.

(10) Patent No.: US 8,567,847 B1
(45) Date of Patent: Oct. 29, 2013

(54) VEHICLES HAVING UTILITY BED WITH FLEXIBLE SEAL

(71) Applicant: Honda Motor Co., Ltd., Tokyo (JP)

(72) Inventors: Darin D. King, Raymond, OH (US); Noriyuki Muto, Columbus, OH (US); Tsuyoshi Kumasaka, Dublin, OH (US); Jacob O. Borth, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/760,111

(22) Filed: Feb. 6, 2013

(51) Int. Cl.
*B62D 33/00* (2006.01)

(52) U.S. Cl.
USPC .................. 296/183.2; 296/183.1; 298/17 R; 180/68.3

(58) Field of Classification Search
USPC ........... 296/183.2, 183.1; 298/17 R; 180/68.3
See application file for complete search history.

(56) References Cited

U.S. PATENT DOCUMENTS

| | | | |
|---|---|---|---|
| 4,923,074 A | 5/1990 | Johnston | |
| 5,046,774 A | 9/1991 | Stockell et al. | |
| 5,086,858 A | 2/1992 | Mizuta et al. | |
| 5,664,822 A | 9/1997 | Rosenfield | |
| 6,695,083 B2 | 2/2004 | Nakamura et al. | |
| 6,892,842 B2 | 5/2005 | Bouffard et al. | |
| 6,959,934 B2 | 11/2005 | Rioux et al. | |
| 7,022,152 B2 | 4/2006 | Tsuruta et al. | |
| 7,147,075 B2 | 12/2006 | Tanaka et al. | |
| 7,156,066 B2 | 1/2007 | Nishizawa | |
| 7,168,516 B2 | 1/2007 | Nozaki et al. | |
| 7,249,798 B2 | 7/2007 | Saito et al. | |
| 7,287,619 B2 | 10/2007 | Tanaka et al. | |
| 7,311,170 B2 | 12/2007 | Isoda et al. | |
| 7,363,999 B2 | 4/2008 | Hastings | |
| 7,438,147 B2 | 10/2008 | Kato et al. | |
| 7,506,712 B2 | 3/2009 | Kato et al. | |
| 7,527,298 B2 | 5/2009 | Tsuchihashi et al. | |
| 7,644,791 B2 | 1/2010 | Davis et al. | |
| 7,690,462 B2 | 4/2010 | Kato et al. | |
| 7,690,472 B2 | 4/2010 | Kato et al. | |
| 7,712,562 B2 | 5/2010 | Nozaki | |
| 7,717,206 B2 | 5/2010 | Tanaka et al. | |
| 7,882,912 B2 | 2/2011 | Nozaki et al. | |
| 7,950,486 B2 * | 5/2011 | Van Bronkhorst et al. | 180/89.11 |
| 8,002,061 B2 | 8/2011 | Yamamura et al. | |

(Continued)

OTHER PUBLICATIONS

"Kawasaki Teryx Dust Guard Instructions" video [online]; YouTube; Ryde'On; uploaded Feb. 28, 2012; retrieved from http://www.youtube.com/watch?v=X95ReW6pG20. See entire video. 1 Page attached. [Retrieved online on Jul. 1, 2013].

(Continued)

*Primary Examiner* — Joseph Pape (74) *Attorney, Agent, or Firm* — Ulmer & Berne LLP (57) ABSTRACT

A vehicle includes a frame, a utility bed, and a flexible seal. The utility bed includes a left side, a right side, a bed frame, and a forward wall supported by the bed frame. The utility bed is pivotally coupled with the frame and pivotable between a hauling position and a dumping position. The flexible seal is attached to at least one of the bed frame and the forward wall of the utility bed. The flexible seal extends downwardly below the forward wall of the utility bed and laterally at least partially between the left side and the right side of the utility bed. When the utility bed is in the hauling position, the flexible seal contacts the frame.

20 Claims, 9 Drawing Sheets

(56) References Cited

U.S. PATENT DOCUMENTS

| | | | |
|---|---|---|---|
| 8,002,359 B2 | 8/2011 | Dormaier | |
| 8,079,602 B2 * | 12/2011 | Kinsman et al. | 280/5.512 |
| 8,205,924 B2 | 6/2012 | Masuda et al. | |
| 8,251,170 B2 | 8/2012 | Miura | |
| 8,256,563 B2 | 9/2012 | Suzuki et al. | |
| 8,302,711 B2 * | 11/2012 | Kinsman et al. | 180/41 |
| 8,336,656 B2 | 12/2012 | Shiratori et al. | |
| 8,381,855 B2 | 2/2013 | Suzuki et al. | |
| 2008/0289896 A1 | 11/2008 | Kosuge et al. | |
| 2011/0304114 A1 | 12/2011 | Spanjers | |
| 2012/0031693 A1 | 2/2012 | Deckard et al. | |
| 2012/0031694 A1 | 2/2012 | Deckard et al. | |
| 2013/0056292 A1 | 3/2013 | Kinsman et al. | |

OTHER PUBLICATIONS

Dust Guard for Kawasaki Teryx, Ryde'On, as shown on and downloaded from http://www.rydeontops.com/htdocs/RydeOnHT/, 11 Pages [Retrieved online on Jul. 1, 2013].

* cited by examiner

VEHICLES HAVING UTILITY BED WITH FLEXIBLE SEAL

TECHNICAL FIELD

Disclosed herein are vehicles having a utility bed with a flexible seal.

BACKGROUND

Some conventional vehicles include a utility bed that is selectively pivotable as a dump-type bed.

SUMMARY

In accordance with one embodiment, a vehicle comprises a frame, an engine supported by the frame, an air intake system, a utility bed, and a flexible seal. The air intake system is configured for supplying air to the engine during operation of the engine. The air intake system comprises an upstream portion defining an air intake opening. The utility bed comprises a left side, a right side, a bed frame, and a forward wall supported by the bed frame. The utility bed is positioned rearward of the air intake opening, and is pivotally coupled with the frame and pivotable between a hauling position and a dumping position. The flexible seal is attached to at least one of the bed frame and the forward wall of the utility bed. The flexible seal extends downwardly below the forward wall of the utility bed and laterally at least partially between the left side and the right side of the utility bed. When the utility bed is in the hauling position, the flexible seal contacts the frame at a location adjacent to the upstream portion of the air intake system, to block air from flowing along a direct path from beneath the utility bed to the air intake opening.

In accordance with another embodiment, a vehicle comprises a frame, a body, at least one front seat, a utility bed, and a flexible seal. The body is supported by the frame. The body and the frame cooperate to at least partially define a front passenger compartment. Each of the at least one front seat is positioned within the front passenger compartment. The utility bed comprises a left side, a right side, a bed frame, and a forward wall supported by the bed frame. The utility bed is positioned rearward of the at least one front seat, and is pivotally coupled with the frame and pivotable between a hauling position and a dumping position. The flexible seal is attached to at least one of the bed frame and the forward wall of the utility bed. The flexible seal extends downwardly below the forward wall of the utility bed and laterally at least partially between the left side and the right side of the utility bed. When the utility bed is in the hauling position, the flexible seal contacts the frame to block air from flowing along a direct path from beneath the utility bed to the front passenger compartment.

BRIEF DESCRIPTION OF THE DRAWINGS

Various embodiments will become better understood with regard to the following description, appended claims and accompanying drawings wherein:

DETAILED DESCRIPTION

Figure 1:
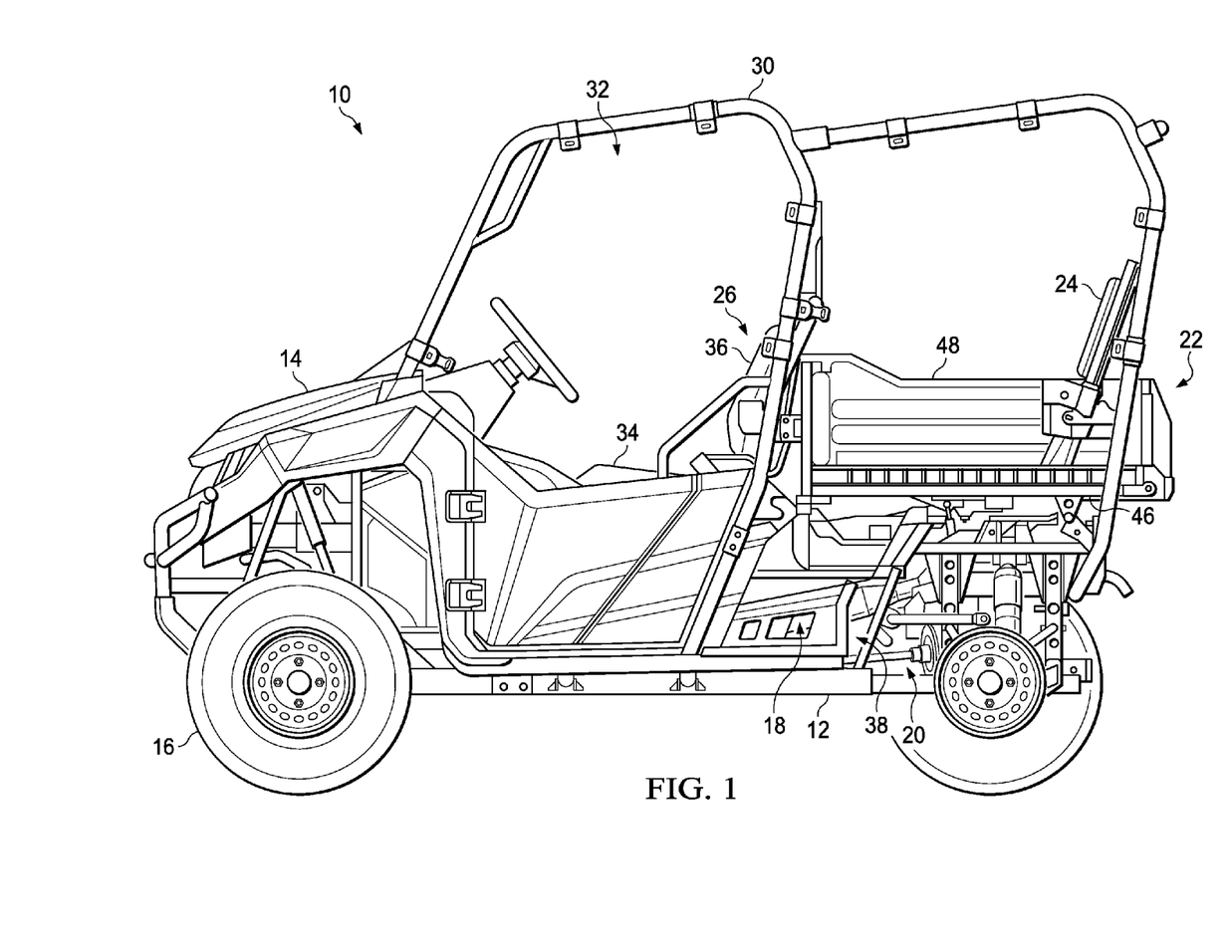
FIG. 1 is side elevational view depicting a multi-use vehicle ("MUV") having a utility bed with flexible seal in accordance with one embodiment, wherein a rear left wheel is removed for clarity of illustration, and wherein the utility bed is in a hauling position.

Certain embodiments are hereinafter described in detail in connection with the views and examples of FIGS. 1-9. FIG. 1 illustrates a vehicle 10 that can include a frame, indicated generally at 12, and a body 14 supported by frame 12. Vehicle 10 can further include a pair of front wheels (e.g., 16) and a pair of rear wheels, which can be suspended from frame 12 and can be rotatable relative to frame 12. Vehicle 10 can also include a source of motive power such as an engine shown generally at 18, which can be an internal combustion engine. The vehicle 10 can also include a drivetrain, shown generally at 20, for transferring torque from the engine 18 to the wheels (e.g., 16).

Figure 2:
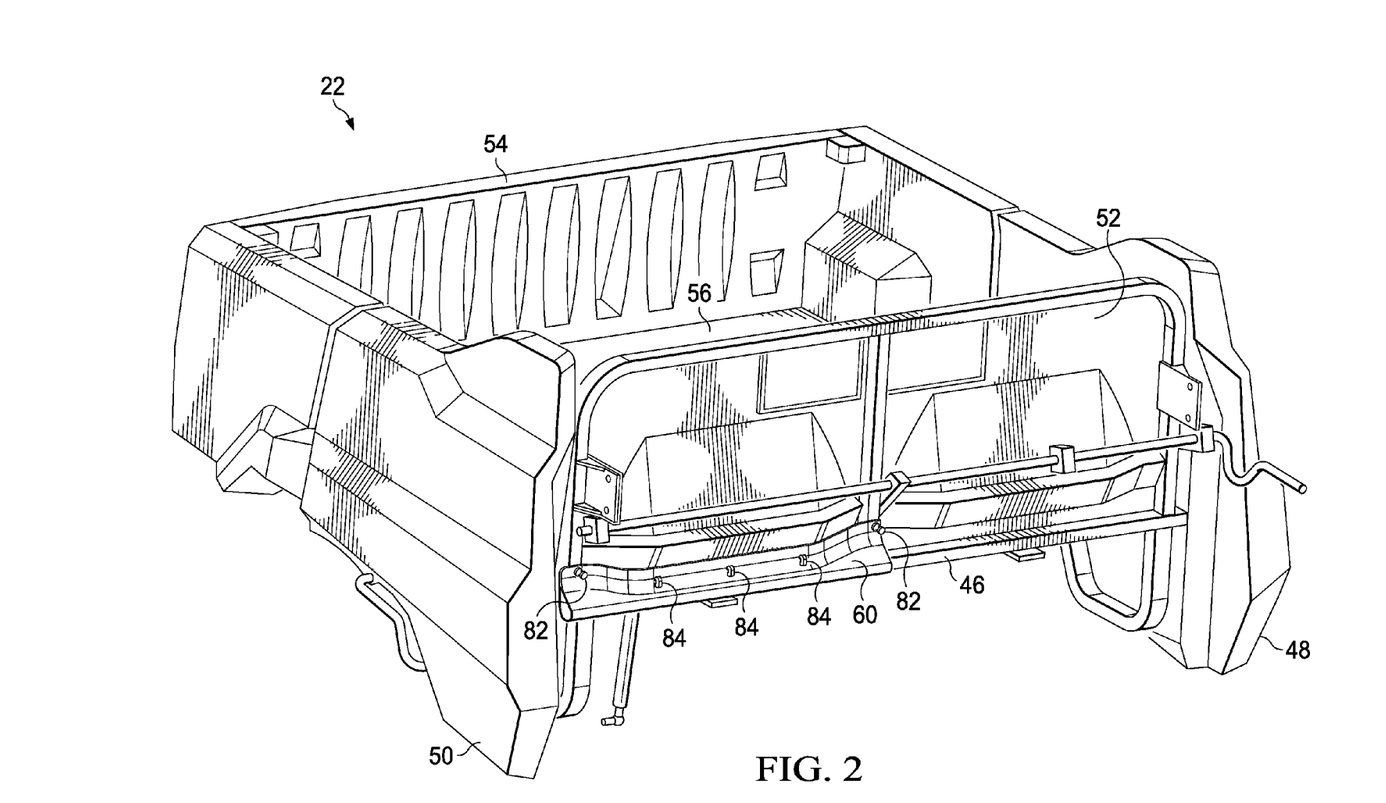
FIG. 2 is an enlarged front perspective view depicting the utility bed removed from the vehicle of FIG. 1, and with a first flexible seal portion.
Figure 3:
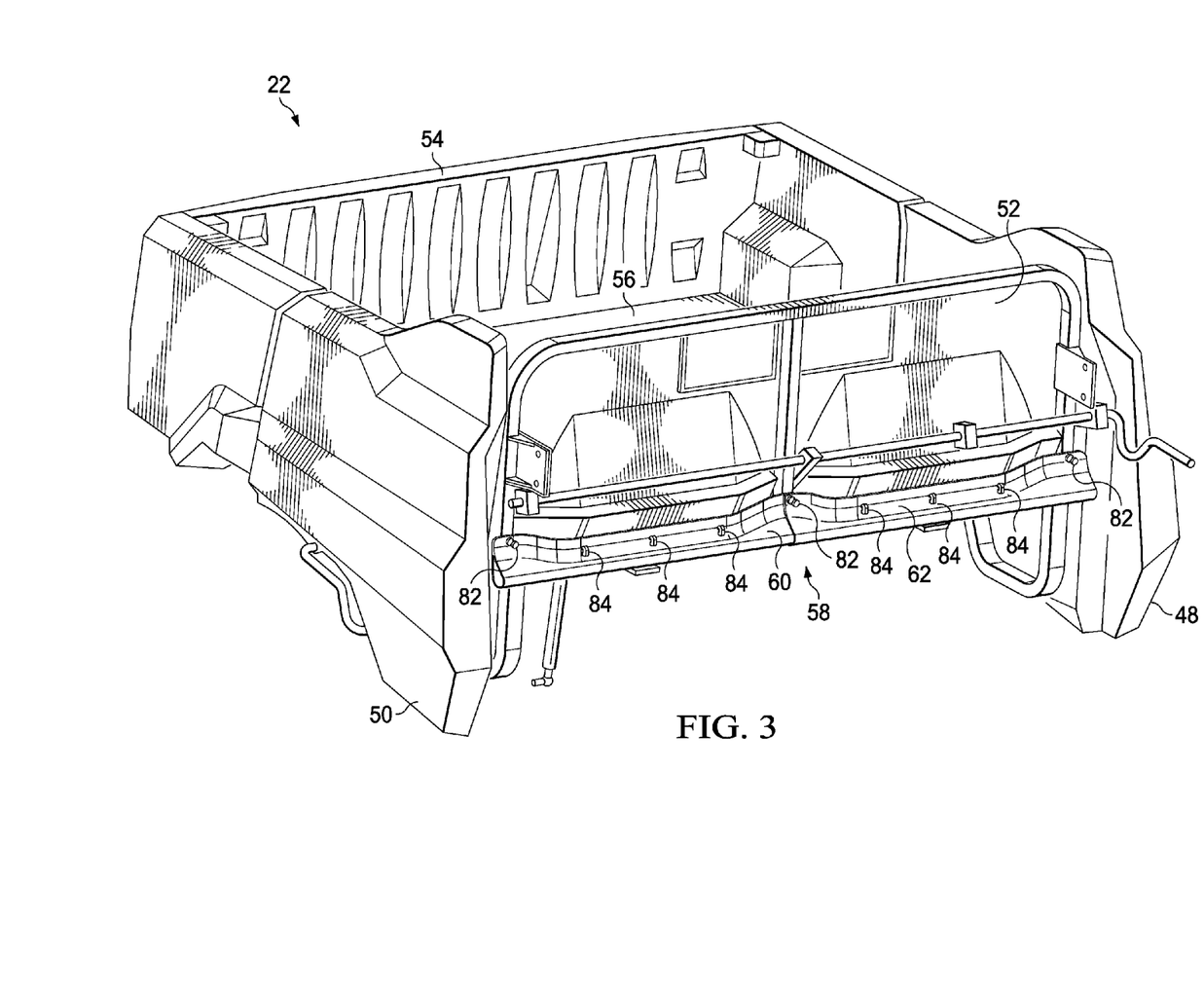
FIG. 3 depicts the arrangement of FIG. 2, but additionally with a second flexible seal portion.
Figure 8:
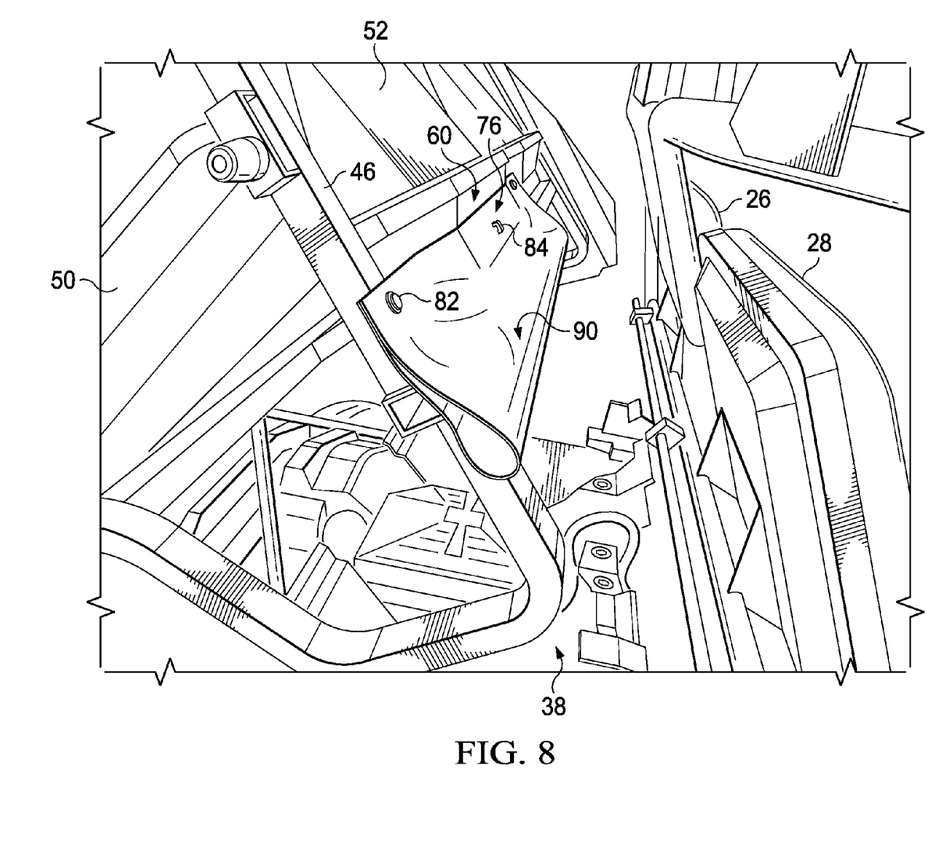
FIG. 8 is a front perspective view depicting the vehicle of FIG. 7, but with the second flexible seal portion removed, and with the utility bed in a dumping position.

Vehicle 10 is shown to be a utility-type vehicle that can include a utility bed 22 that can be pivotally coupled with the frame 12 and pivotable between a hauling position (FIG. 1) and a dumping position (FIG. 8). The utility bed 22 can include a bed frame 46 as well as a left side 48, a right side 50, a forward wall 52, a pivotable tailgate 54, and a cargo floor 56, which can each be supported by the bed frame 46, as shown in FIGS. 2-3. The utility bed 22 can be convertible, to selectively provide a left rear seat 24 and a right rear seat (not shown) to facilitate seating of persons (as shown in FIG. 1), and to alternatively facilitate folding downward of the left rear seat 24 and/or the right rear seat into the utility bed 22 to define a portion of the cargo floor 56. In an alternative embodiment, a utility bed of a vehicle might not include rear seats.

Vehicle 10 can further include a left front seat 26 and a right front seat 28 (FIGS. 8-9) that can be supported by the frame 12 and/or body 14. Each of the left front seat 26 and the right front seat 28 can include both a seat bottom 34 and a seat back 36. Each of the left rear seat 24, the right rear seat, the left front seat 26, and the right front seat 28 can be configured to support a respective person such as an operator (e.g., a driver or a passenger) of the vehicle 10. Vehicle 10 can include a roll cage 30 which can be attached to, and supported by, the frame 12 and/or body 14 of vehicle 10. The body 14 and the frame 12 can cooperate with one another and one or more other components of the vehicle 10, such as the roll cage 30, to define a front passenger compartment 32. Each of the left front seat 26 and the right front seat 28 are shown to be positioned within the front passenger compartment 32.

Figure 9:
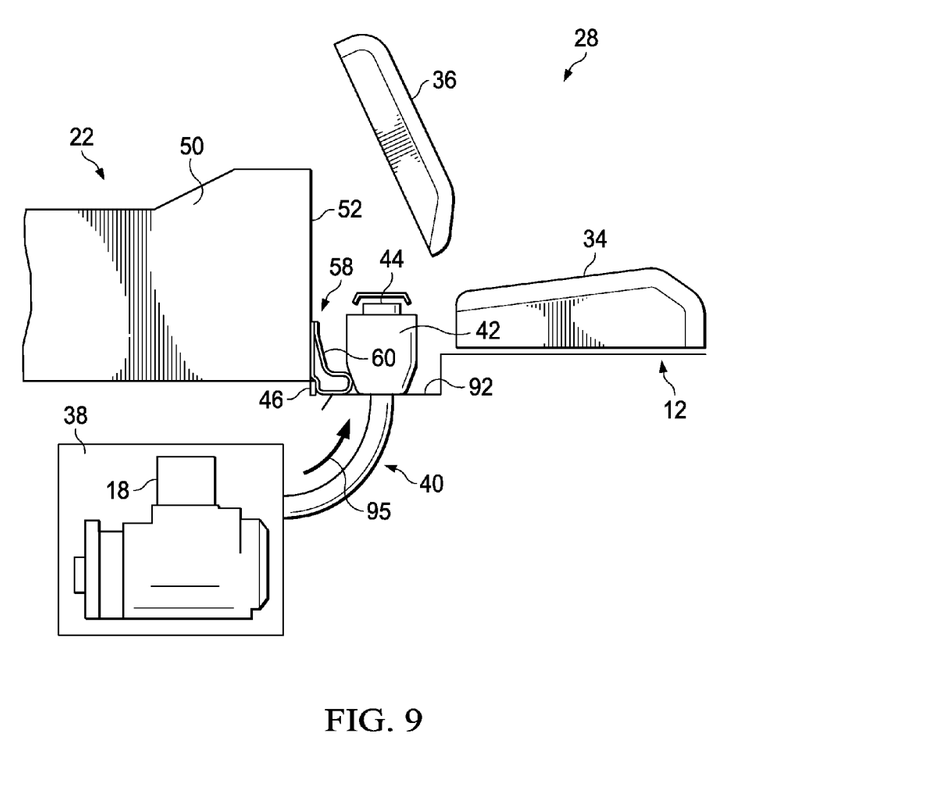
FIG. 9 is a right side schematic view depicting certain components of the vehicle of FIG. 1.

In one embodiment, the frame 12 can at least partially define an engine compartment 38. In one embodiment, the engine compartment 38 can be disposed rearward of the left and right front seats 26, 28, and below the utility bed 22, as generally shown in FIGS. 1 and 9. The engine 18 can be positioned and supported by the frame 12 within the engine compartment 38, such that the engine 18 is disposed at a vertical location disposed beneath a plane defined by the cargo floor 56 of the utility bed 22.

Figure 7:
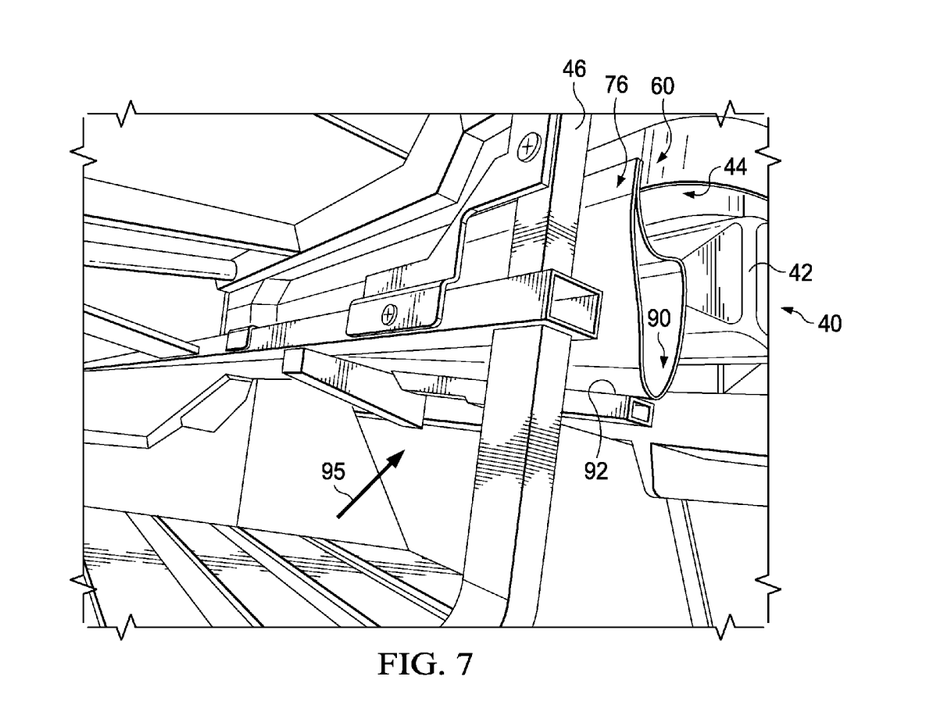
FIG. 7 is a rear perspective view generally depicting a portion of the vehicle of FIG. 1, including depiction of the first flexible seal portion contacting both the frame and an upstream portion of an air intake system of the vehicle.

In one embodiment, as shown in FIGS. 7 and 9, the vehicle 10 can include an air intake system 40 configured for supplying air to the engine 18 during operation of the engine 18. The air intake system 40 can include an upstream portion 42 that defines an air intake opening 44. The seat bottom 34 of the left front seat 26 and the seat bottom (not shown) of the right front seat 28 can be forward of the air intake opening 44. The utility bed 22 can be positioned rearward of the air intake opening 44.

Figure 4:
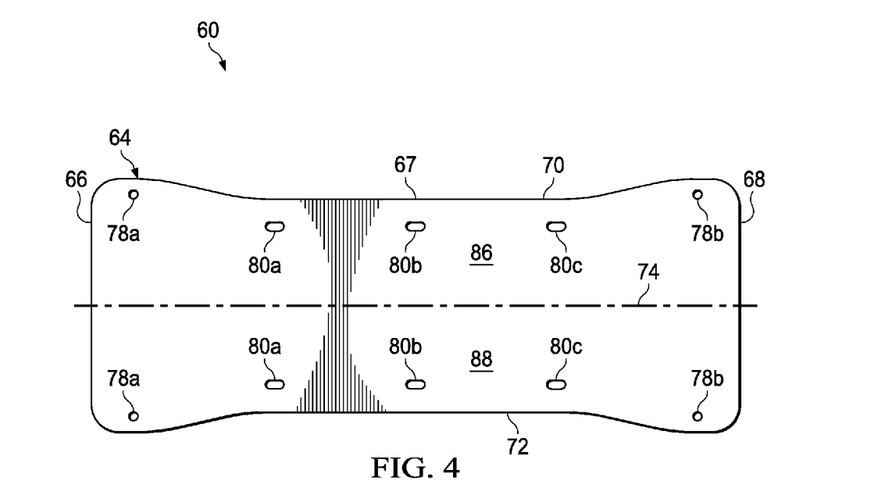
FIG. 4 is a plan view depicting the first flexible seal portion as removed from the utility bed of FIG. 2 and unfolded.

A flexible seal 58 can be attached to at least one of the bed frame 46 and the forward wall 52 of the utility bed 22, as shown in FIG. 3. More particularly, the flexible seal 58 can include a first flexible seal portion 60 and a second flexible seal portion 62, each of which is shown in FIG. 3 to extend downwardly below the forward wall 52 of the utility bed 22. The first flexible seal portion 60 can comprise a sheet of flexible material 64, such as rubber or another suitable elastomeric material, having a length extending from a first end 66 to a second end 68, and a width extending from a first side edge 70 to a second side edge 72, when laid flat as shown in FIG. 4. The sheet of flexible material 64 can also include a first lateral portion 86 extending from a longitudinal axis 74 to the first side edge 70, and a second lateral portion 88 extending from the longitudinal axis 74 to the second side edge 72. In one embodiment, the sheet of flexible material 64 can have a bone-shape when laid flat, as shown in FIG. 4, wherein the width of the sheet of flexible material 64 is greater near the first and second ends 66 and 68, than at a midpoint (e.g., 67) disposed longitudinally between the first and second ends 66 and 68. However, in alternative embodiments, a sheet of flexible material of a flexible seal portion can have a different shape when laid flat, such as rectangular, for example.

Figure 5:
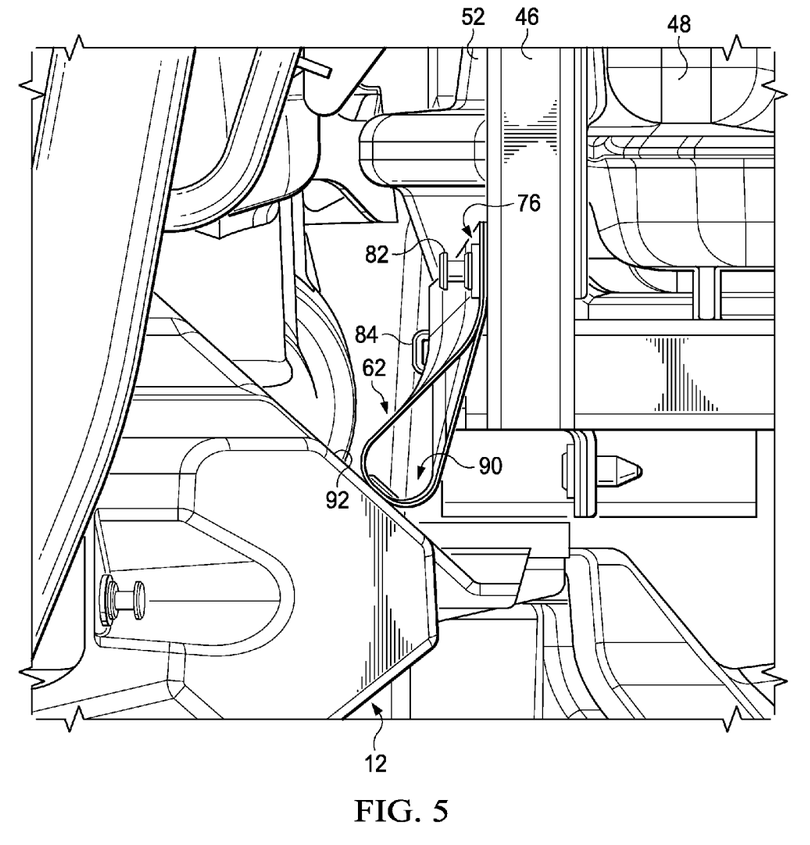
FIG. 5 is an enlarged side elevational view depicting a portion of the vehicle of FIG. 1, including depiction of the second flexible seal portion contacting a frame of the vehicle.
Figure 6:
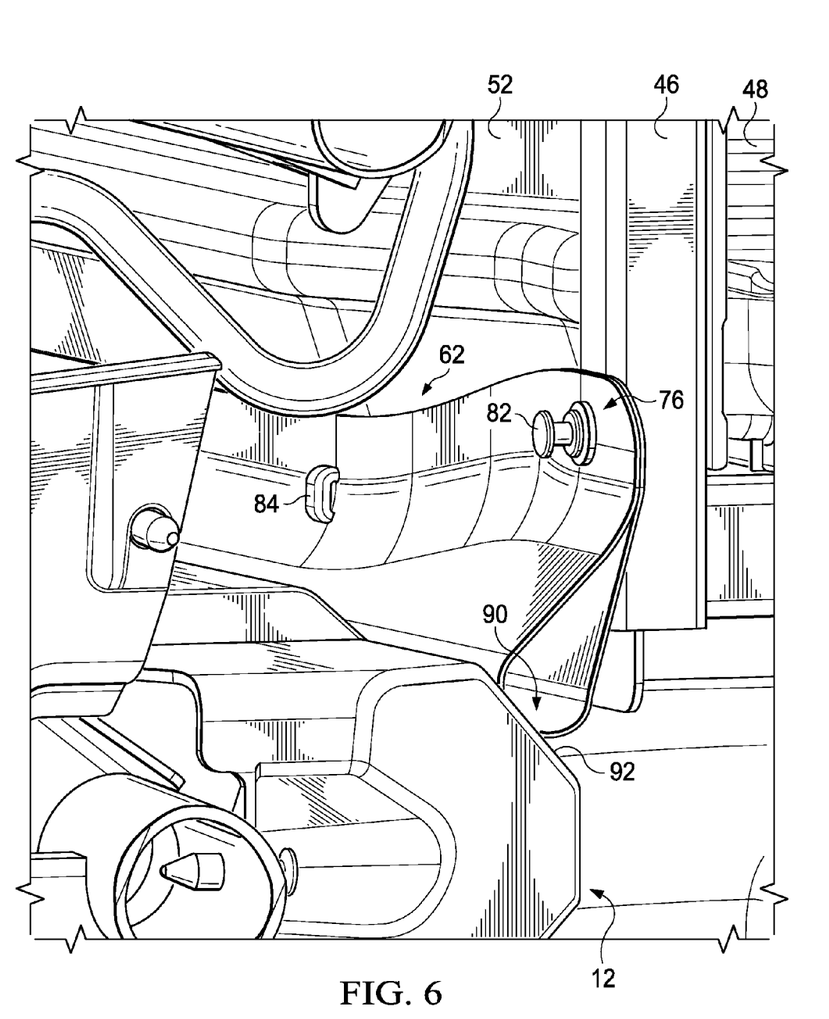
FIG. 6 is a front perspective view depicting the arrangement of FIG. 5.

The sheet of flexible material 64 can be folded generally across the longitudinal axis 74, such that the first side edge 70 and the second side edge 72 are positioned adjacent one another to define a mounting portion 76 of the first flexible seal portion 60, and such that a generally bulbous portion 90 is defined (e.g., as shown in FIGS. 7-8 with respect to the first flexible seal portion 60, and as shown in FIGS. 5-6 with respect to the second flexible seal portion 62). Respective pairs of aligned apertures 78a and 78b in the sheet of flexible material 64 can be configured to receive respective fasteners 82 to facilitate attachment of the mounting portion 76 of the first flexible seal portion 60 to the bed frame 46 and/or the forward wall 52 of the utility bed 22, such as shown in FIGS. 2-4. Respective pairs of aligned apertures 80a, 80b, and 80c in the sheet of flexible material 64 can be configured to receive respective studs 84 to facilitate attachment of the mounting portion 76 of the first flexible seal portion 60 to the bed frame 46 and/or the forward wall 52 of the utility bed 22, such as shown in FIGS. 2-4. The second flexible seal portion 62 can be formed similarly to the first flexible seal portion 60, and can be attached to the bed frame 46 and/or the forward wall 52 of the utility bed 22 in a similar fashion with fasteners 82 and studs 84, as generally shown in FIG. 3, for example. In one embodiment, the first and second flexible seal portions 60 and 62 can partially overlap and be attached to one another, such as with one of the fasteners 82, such as shown in FIG. 3. In one embodiment, the fasteners 82 can comprise clips, push-pins, or bolts, for example, and the studs 84 can extend from the bed frame 46 and/or the forward wall 52. It will be appreciated that, in other embodiments, any of a variety of other suitable fasteners and/or structures can be provided to attach a flexible seal to a bed frame and/or forward wall of a utility bed.

The flexible seal 58 is shown to extend laterally between and to each of the left side 48 and the right side 50 of the utility bed 22. More particularly, in the configuration of FIG. 3, the first flexible seal portion 60 is shown to extend from the right side 50 of the utility bed 22 and about halfway to the left side 48 of the utility bed 22, and the second flexible seal portion 62 is shown to extend from the left side 48 of the utility bed 22 and about halfway to the right side 50 of the utility bed 22. Due to the bone-shape of the sheet of flexible material 64 (as shown in FIG. 4), the flexible seal 58 can effectively mate and/or conform with the mating surface 92, the upstream portion 42 of the air intake system 40, and/or other components of the vehicle 10, when the utility bed 22 is in the hauling position, to block air flow such as described below. In addition, the bone-shape of the sheet of flexible material 64 can be resistant to wear and undesired bowing over time, and can have a pleasing aesthetic appearance.

While the first and second flexible seal portions 60 and 62 are shown to be approximately the same length (along the longitudinal axis 74) as one another, it will be appreciated that, in other embodiments, first and second flexible seal portions can be of differing lengths. It will also be appreciated that a flexible seal can include one continuous, unitary member, instead of two respective flexible seal portions. In yet another embodiment, a flexible seal can include one unitary member, but can have a discontinuous portion forming more than one flexible seal portion. In still another embodiment, a flexible seal can include more than two flexible seal portions. In another embodiment, a flexible seal might only extend about half the width of the utility bed (e.g., as shown in FIG. 2, with only the first flexible seal portion 60 attached).

It will be appreciated that a flexible seal can be formed from any of a variety of other suitable materials and/or to have any of a variety of other suitable shapes, to effectively mate and/or conform with a mating surface (e.g., 92), an upstream portion (e.g., 42) of an air intake system, and/or other components of a vehicle, when a utility bed of the vehicle is in a hauling position, to block air flow such as described below with reference to the flexible seal 58. For example, in one alternative embodiment, a flexible seal can be a sponge rubber seal, e.g., similar to that frequently employed for use with certain conventional automobile doors. In another alternative embodiment, a flexible seal can comprise a single-lip rubber strip, e.g., similar to that located along sides of a conventional roll-up door. Thus, while the flexible seal 58 is shown to comprise the folded sheet of flexible material 64, it will be appreciated that a flexible seal can alternatively not include any folding, and in some embodiments might further not include any bulbous portion.

The generally bulbous portion 90 of the first flexible seal portion 60 can extend along the longitudinal axis 74 and can contact a mating surface 92 of the frame 12 when the utility bed 22 is in the hauling position, as shown in FIGS. 7 and 9. Similarly, the generally bulbous portion (also shown as 90) of the second flexible seal portion 62 can extend along the longitudinal axis 74 and can contact the mating surface 92 of the frame 12 when the utility bed 22 is in the hauling position, as shown in FIGS. 5-6.

When the utility bed 22 is in the hauling position, the flexible seal 58 (e.g., the generally bulbous portion 90 of the first flexible seal portion 60) can contact the mating surface 92 of the frame 12 at a location adjacent to the upstream portion 42 of the air intake system 40, to block air (e.g., dusty air from the ground, or heated air from the engine compartment 38) from flowing along a direct path (represented by arrow 95)

from beneath the utility bed 22 to the air intake opening 44 and/or the front passenger compartment 32, as will be appreciated with reference to FIGS. 7 and 9. In this position, in one embodiment, the flexible seal 58 (e.g., the generally bulbous portion 90 of the first flexible seal portion 60) can also contact the upstream portion 42 of the air intake system 40, as generally shown in FIGS. 7 and 9. Due to the flexible nature of the flexible seal 58, noise and vibration is unlikely to be generated by the flexible seal 58 during movement of the vehicle 10. When the utility bed 22 is moved to the dumping position, as shown in FIG. 8, the flexible seal 58 can be spaced from the frame 12 (e.g., the mating surface 92) and the upstream portion 42 of the air intake system 40. The upstream portion 42 can be adjacent and/or attached to the mating surface 92.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a frame;
an engine supported by the frame;
an air intake system configured for supplying air to the engine during operation of the engine, the air intake system comprising an upstream portion defining an air intake opening;
a utility bed comprising a left side, a right side, a bed frame, and a forward wall supported by the bed frame, the utility bed being positioned rearward of the air intake opening, the utility bed being pivotally coupled with the frame and pivotable between a hauling position and a dumping position; and
a flexible seal attached to at least one of the bed frame and the forward wall of the utility bed, the flexible seal extending downwardly below the forward wall of the utility bed and laterally at least partially between the left side and the right side of the utility bed;
wherein, when the utility bed is in the hauling position, the flexible seal contacts the frame at a location adjacent to the upstream portion of the air intake system, to block air from flowing along a direct path from beneath the utility bed to the air intake opening.

2. The vehicle of claim 1, wherein the flexible seal is spaced from the frame when the utility bed is in the dumping position.

3. The vehicle of claim 2, wherein the flexible seal comprises a sheet formed from an elastomeric material.

4. The vehicle of claim 3, wherein the flexible seal defines a mounting portion and a generally bulbous portion, the mounting portion attached to at least one of the bed frame and the forward wall of the utility bed, and the generally bulbous portion extending along a longitudinal axis and contacting the frame when the utility bed is in the hauling position.

5. The vehicle of claim 4, wherein:
the sheet has a length extending from a first end to a second end, and a width extending from a first side edge to a second side edge;
the width is greater near the first and second ends, than at a midpoint disposed longitudinally between the first and second ends; and
the sheet is folded generally across the longitudinal axis, such that the first side edge and the second side edge are positioned adjacent one another to define the mounting portion of the flexible seal.

6. The vehicle of claim 2, wherein:
the flexible seal contacts the upstream portion of the air intake system when the utility bed is in the hauling position and is spaced from the upstream portion of the air intake system when the utility bed is in the dumping position.

7. The vehicle of claim 2, wherein:
the flexible seal comprises a first flexible seal portion; and
the first flexible seal portion extends about halfway between the first side and the second side of the utility bed.

8. The vehicle of claim 7, further comprising fasteners attaching the flexible seal to at least one of the bed frame and the forward wall of the utility bed.

9. The vehicle of claim 7, wherein:
the flexible seal further comprises a second flexible seal portion;
the first flexible seal portion extends from the right side of the utility bed and about halfway to the left side of the utility bed; and
the second flexible seal portion extends from the left side of the utility bed and about halfway to the right side of the utility bed.

10. The vehicle of claim 4 wherein:
the flexible seal defines a longitudinal axis and comprises a first side edge, a second side edge, a first lateral portion extending from the longitudinal axis to the first side edge, and a second lateral portion extending from the longitudinal axis to the second side edge; and
the flexible seal is folded generally about the longitudinal axis such that the first side edge and the second side edge are positioned adjacent one another and attached to at least one of the bed frame and the forward wall of the utility bed.

11. The vehicle of claim 9, further comprising fasteners attaching the first flexible seal portion and the second flexible seal portion to one another and to at least one of the bed frame and the forward wall of the utility bed.

12. The vehicle of claim 2, further comprising:
a body supported by the frame, the body and the frame cooperating to at least partially define a front passenger compartment; and
at least one front seat, each of the at least one front seat being positioned within the front passenger compartment; wherein
the frame at least partially defines an engine compartment, the engine compartment disposed rearward of the at least one front seat and below the utility bed;
the engine is positioned within the engine compartment; and
when the utility bed is in the hauling position, the flexible seal is configured to block air from flowing along a direct path from the engine compartment to the front passenger compartment.

13. The vehicle of claim 12, wherein:
each of the at least one front seat comprises a seat bottom and a seat back; and
for each of the at least one front seat, at least the seat bottom is forward of the air intake opening.

14. The vehicle of claim 1, wherein the utility bed is convertible to selectively provide at least one rear seat.

15. A vehicle comprising:
a frame;
a body supported by the frame, the body and the frame cooperating to at least partially define a front passenger compartment;
at least one front seat, each of the at least one front seat being positioned within the front passenger compartment;
a utility bed comprising a left side, a right side, a bed frame, and a forward wall supported by the bed frame, the utility bed being positioned rearward of the at least one front seat, the utility bed being pivotally coupled with the frame and pivotable between a hauling position and a dumping position; and
a flexible seal attached to at least one of the bed frame and the forward wall of the utility bed, the flexible seal extending downwardly below the forward wall of the utility bed and laterally at least partially between the left side and the right side of the utility bed;
wherein, when the utility bed is in the hauling position, the flexible seal contacts the frame to block air from flowing along a direct path from beneath the utility bed to the front passenger compartment.

16. The vehicle of claim 15, wherein the flexible seal is spaced from the frame when the utility bed is in the dumping position.

17. The vehicle of claim 16, wherein the flexible seal comprises a sheet formed from an elastomeric material.

18. The vehicle of claim 17, wherein the flexible seal defines a mounting portion and a generally bulbous portion, the mounting portion attached to at least one of the bed frame and the forward wall of the utility bed, and the generally bulbous portion extending along a longitudinal axis and contacting the frame when the utility bed is in the hauling position.

19. The vehicle of claim 18, wherein:
the sheet has a length extending from a first end to a second end, and a width extending from a first side edge to a second side edge;
the width is greater near the first and second ends, than at a midpoint disposed longitudinally between the first and second ends; and
the sheet is folded generally across the longitudinal axis, such that the first side edge and the second side edge are positioned adjacent one another to define the mounting portion of the flexible seal.

20. The vehicle of claim 16, wherein:
the flexible seal further comprises a second flexible seal portion;
the first flexible seal portion extends from the right side of the utility bed and about halfway to the left side of the utility bed; and
the second flexible seal portion extends from the left side of the utility bed and about halfway to the right side of the utility bed.

* * * * *